April 12, 1960  M. FOURESTIER ET AL  2,932,294
LIGHTING DEVICES FOR ENDOSCOPES
Filed Oct. 10, 1955  2 Sheets-Sheet 1
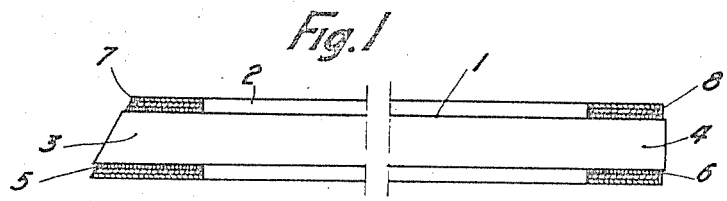
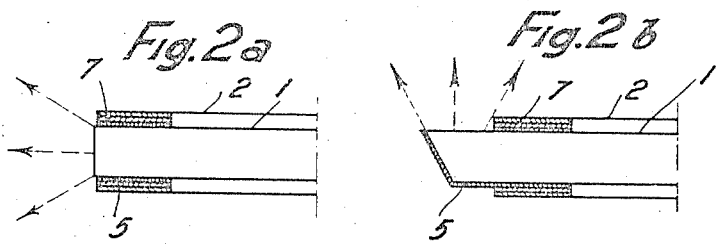
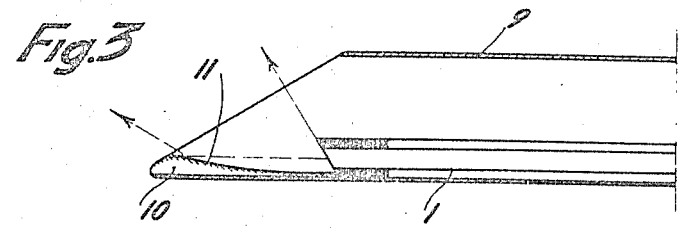
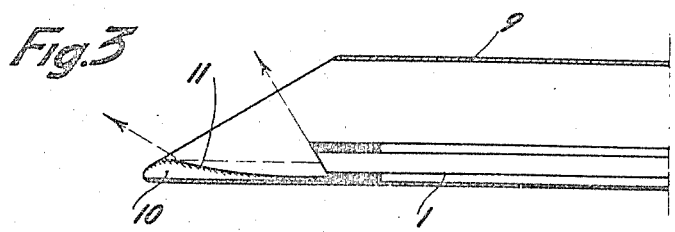
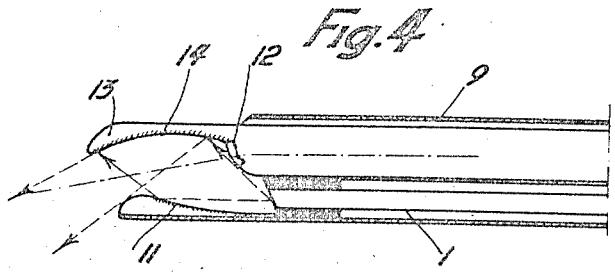
Inventors
Max Fourestier
Jacques Claude Vulmiere
Huguette Grangaud Vulmiere
Amedee Joseph Gladu
By Allen & Allen
attorneys

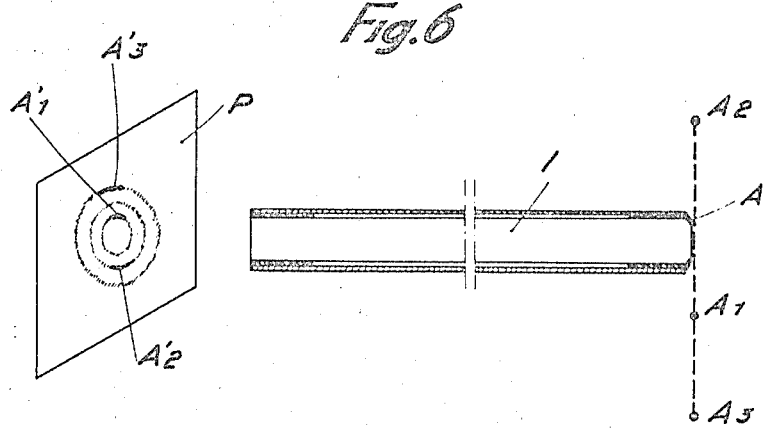
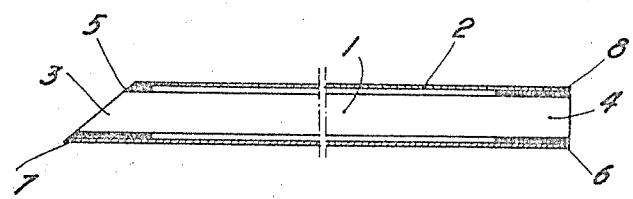
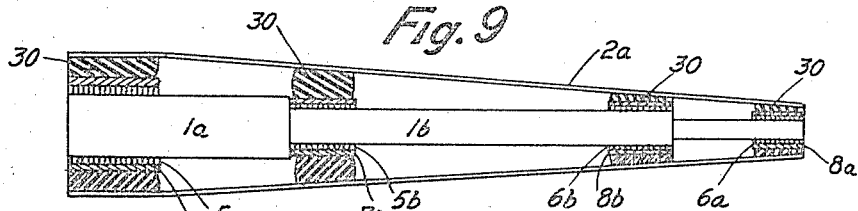
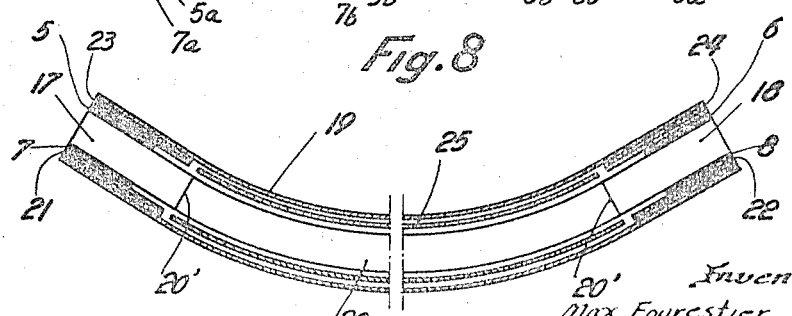

United States Patent Office

2,932,294
Patented Apr. 12, 1960

2,932,294
LIGHTING DEVICES FOR ENDOSCOPES

Max Fourestier, Vanves, Jacques Vulmiere and Huguette Vulmiere, born Grangaud, Pre-Saint-Gervais, and Amedee Joseph Gladu, Vernon, France, assignors to Centre National de la Recherche Scientifique, Paris, France, a corporation of France Application October 10, 1955, Serial No. 539,632

Claims priority, application France October 13, 1954

11 Claims. (Cl. 128—6)

The present invention has for its object improvements in lighting devices used in endoscopes, in which a transparent rod transmits into the interior of the cavity to be illuminated, and at a very wide field angle (50° and more), the light obtained from a source located at the exterior.

The invention, which enables the illumination of the cavity observed to be increased, either by direct vision or by lateral vision, is more particularly but not exclusively applicable to the devices described in the previous Patent No. 2,699,770 of January 18, 1955.

In these devices, the radiation emitted by an external source of light located laterally, is concentrated on the extremity of a straight transparent rod which serves as a light guide, the image of the source being formed on that extremity or in its immediate vicinity. It can be shown that the most correct arrangement corresponds to the case in which the magnification of the optical system is equal to one, that is to say to the case in which the image of the source of light has the same size as the source itself, and has the same dimensions as the upper extremity of the transparent rod.

After having been subjected to a reflection on a 90° flint prism of well-defined dimensions which enable the opening of the beam to be maintained, the radiation is propagated along the transparent rod and reaches the other extremity, after having been subjected to reflections on the walls of the rod, the number of which increases as the size of the opening of the beam itself increases.

The quantity of light transmitted depends on the value of the coefficient of reflection on the walls and on the coefficient of transmission of the material of which the rod is formed. It is thus desirable to use a rod of high transparency, and experience has shown that transparent silica of optical quality gives satisfactory results.

The optimum conditions relating to reflections from the walls are those which correspond to total reflection, for which the coefficient of reflection is equal to unity. It would thus appear advantageous to use a rod which is not provided with any coating, but, when the beam has a large opening, serious difficulties are met with in practice, due to the fact that the rod becomes covered with mist, grease or any other substance during the use of the apparatus, and the lighting efficiency becomes thereby seriously reduced. For this reason, it has been proposed to cover the rod with a reflecting metallic deposit. The coefficient of reflection is then that which exists between the transparent substance and the reflecting deposit. Even when deposits having the highest reflecting values are employed, the intensity of the radiation at the extremity of the rod is considerably reduced by reason of the very large number of reflections. The result obtained is still less satisfactory if the rod is glued, without reflecting deposit, inside a sheath, since, as the limiting angle increases, there is only a total reflection for a beam of a small opening, and the rays which correspond to a larger opening become refracted in the glue and are absorbed by the walls of the metallic sheath.

When it is desired to obtain a uniformly illuminated field of observation, it is essential that the whole of the section of the rod which receives the light coming from the source should itself be uniformly lighted. Theory shows that a straight light-guide transmits more light than a curved light-guide. It is thus preferable, whenever this is found possible, to use a straight rod, of transparent silica for example. However, in the case of certain applications, and especially in gastroscopy, it is absolutely necessary to use a flexible and deformable guide.

In accordance with the present invention, with a view to increasing the illumination of a cavity to be observed, a lighting device for endoscopes having a transparent rod which transmits to the interior of the cavity the light provided by a source situated on the exterior, is characterized by the fact that, over a very small length from each of its extremities, the lateral parts of the rod are coated with a reflecting deposit, and that the rod is mounted in a hermetically-tight sheath by the intermediary of a water and gas-tight coupling between the sheath and the parts which are coated with the said reflecting deposits, a space filled with dry gas being kept between the sheath and the rod. The sheath is tight against humidity, grease and any other substance; the water and gas-tight connection between the sheath and the tube is effected for example by means of a glue, a cement, rubber, etc.

A further feature of the invention is that the transparent rod which serves as a light-guide, does not reach the extremity of the endoscopic tube, this extremity being then provided with a mirror (plane, curved or with facets) which co-operates with the transparent rod in such a way that a portion of the rays issuing from the rod is reflected from the mirror so as to increase the illuminated field.

In addition, there may be fixed at the extremity of the endoscopic optical system, either a mirror or a prism, so as to reflect or to deflect the rays of light with a view to facilitating observation by lateral vision.

On the other hand, the invention provides that the lighting of the whole of the section of the rod which receives the light is uniform. In particular, the entering face is trued-off after assembly and it has no chamfer and no inset. Finally, a feature of the invention is that the rod acting as a light-guide may be composite and formed of a number of sections placed together inside a sheath, each section having no chamfered edges, no insetting and no diaphragm, at least one of these sections being of flexible transparent material.

In the attached drawings, there have been shown various forms of embodiment of the devices in accordance with the present invention. In these drawings:

Fig. 1 is a view in axial cross-section of a rod type light-guide fixed in its sheath;

Fig. 2a shows in cross-section the lower extremity of a rod type light-guide in accordance with the invention and arranged for observation by direct vision;

Fig. 2b is a view similar to that of Fig. 2d, but arranged for the case of observation by lateral vision, that is to say in which it is desired to illuminate the lateral walls of the cavity to be observed;

Fig. 3 shows how a mirror may be fitted to the endoscopic tube in order to facilitate lateral vision;

Fig. 4 is a view in axial cross section of the extremity of an endoscope, and shows how a mirror fixed to the optical system of an endoscope enables the radiation to be concentrated on the zone observed, for lateral vision;

Fig. 5 is a view similar to that shown in Fig. 4, and shows how a prism fixed to the optical system of an endoscope can deflect laterally the beam of light rays with a view to directing the light on the lateral wall which is to be observed;

Fig. 6 is a view in cross-section of a light-guide which has been incorrectly mounted and which gives rise to shadow zones in the field of observation;

Fig. 7 shows how a correct mounting may be obtained;

Fig. 8 shows a view in axial cross-section of a flexible light-guide in accordance with the invention;

Fig. 9 is a view in axial cross-section of a modified light guide.

In conformity with the invention, the rod light-guide 1 is placed inside a sheath 2 which is proof against humidity, a space filled with dry air being kept between the rod and the sheath. At the extremities 3 and 4, the rod is covered over a small portion of its length, with a reflecting deposit. If the rod is for example of transparent silica, the deposit may be comprised by a silvering 5 and 6 covered with a copper coating 7 and 8. The whole is made tight to the sheath 2 by any suitable means (glue, cement, rubber, etc.).

If it is desired to have an illumination uniformly distributed around the axis of the rod, the lower extremity of the rod is given a polished surface perpendicular to the axis (see Fig. 2a). It is often an advantage to give the axis of the beam a direction which forms a certain angle with the axis of the rod. The extremity is then cut-off to a bevel, such as is shown in Fig. 1.

When a lateral illumination is required, it is preferable to cut the extremity of the rod to a bevel shape and then to cover it with a reflecting deposit (see Fig. 2b).

The extremity of the transparent rod may also be cut to a bevel and polished (see Fig. 3), but the rod does not reach the extremity of the endoscopic tube 9, the terminal part 10 of which is covered with a mirror 11, which may be a mirror having facets, a curved mirror or a plane mirror.

There is generally passed through the endoscopic tube an optical system which permits of observation and photography. Some of these optical systems are specially designed for lateral observation. In accordance with the invention, this observation is facilitated by providing the extremity of the optical system 12 with a member 13 having a reflecting surface 14 (see Fig. 4) which co-operates with the mirror 11 to direct the flux of light issuing from the rod 1 towards the region to be observed.

A further device in accordance with the invention, and having the same object, is shown in Fig. 5. The radiation issuing from the rod 1 and that reflected from the mirror 11, pass through a flint prism 15 which is rigidly fixed to the optical system 16, and are deflected with a view to giving a special illumination of the region to be observed.

There have been shown in Fig. 6 the phenomena which take place in an assembly in which the whole of the entering face of the rod is not uniformly lighted. If there exists on the entering face of the rod a zone A which is less brightly lit (or which is dark), the successive images of this zone resulting from reflection on the walls of the rod 1, are formed in the plane of the entering face at $A_1$, $A_2$, $A_3$, etc., the images farthest away corresponding to the greatest number of reflections. At the exit, in a frontal plane P, the points $A_1$, $A_2$, $A_3$, are projected, with respect to the exit face considered as a pupil, at $A'_1$, $A'_2$, $A'_3$, and give a number of dark zones which are the more clearly marked as the number of reflections is lower (center of the field) and as the pupil is smaller, that is to say as the ratio of length to diameter becomes greater.

If the zone A has the form of a ring, there are formed in the frontal planes at the exit of the rod, a series of rings $A'_1$, $A'_2$, $A'_3$ which are especially visible at the center of the field and which become more pronounced as the length of the tube increases, for a given diameter.

Rings of this kind are especially formed:

If the beam of light rays is diaphragmed, or

If there exists a chamfer on the edge of the rod, or

If the top of the rod is inset.

It is these rings which are seen in the shape of a dark zone in Fig. 6, in which the rod 1 is mounted by means of an inset at its entry face and provides a field of light which has dark zones in the form of rings. On the other hand, Fig. 7 shows a correct assembly with the entering face of the rod 1 trued-off after it has been mounted inside the sheath 2. This assembly gives light guides having a very high efficiency and giving a uniform illumination of the field.

In order to produce a light guide of rigid form, there may be employed with advantage a straight or curved rod of transparent silica. This is a very transparent substance which can quite easily be given an optical surface and which possesses in addition the properties of being readily covered by a very adhesive reflecting deposit, for example by silvering. Now, as has already been stated above, highly adhesive reflecting deposits 5 and 6 which are free from any defect, are necessary at the points of fixation of the rod 1 to the sheath 2 in order to obtain a good light efficiency from the assembly.

In the case in which a flexible and deformable guide is necessary (in gastroscopy for example) a rod of transparent and flexible material can be employed and can be mounted, as has been indicated above. But experience has shown that it is very difficult to obtain on such substances reflecting deposits which are sufficiently adherent.

The arrangement of Fig. 8 shows a flexible guide produced in accordance with the invention. The rod light-guide is a composite rod formed of two rigid end portions 17 and 18, for example of silica, fixed to the extremities of a sheath 19 and a rod 20, of plastic material, very transparent and very flexible, placed inside the sheath 19 between the two rigid end portions, the plane extremities 20' of the said flexible rod 20 being supported against the internal faces of the end portions. Each end portion is covered on its lateral side in the vicinity of one extremity, with a reflecting deposit constituted, for example, by a silvering 5—6, covered with a deposit of copper 7—8. By means of a glue or on an appropriate binder, the end portion is fixed to a nickel tube 21—22 which is rigidly fixed to the sheath 19 by means of a suitable hermetically-tight joint 23—24 (glue, cement, rubber-joint, etc.).

During the bending movements, in order to avoid any optical contact between the flexible rod 20 and its sheath 19, there may be interposed between these two either a matt paper or a rough sheath 25 having an index of refraction as low as possible.

In accordance with the invention, the entering and exit surfaces have no inset and are not chamfered. In the same way, the contact surfaces between the rigid sections and the flexible sections should be perfectly trued and polished and should have no chamfer.

It is not absolutely necessary that the three sections should have the same diameter, but when the terminal portion of the guide should have a diameter less than that of the image of the source, there is an advantage in utilising for the longest possible portion of the path, sections of greatest diameter. For the same angle of entry into the rod, the number of reflections increases in fact as the diameter of the rod becomes smaller.

Even in the case of total reflection without metallic surface (a bare rod), it is preferable to have few reflections by reason of the losses of light due to imperfections of the surface.

In Figure 9 there is shown an arrangement useful in cases where the cavity to be illuminated is small, whereas the guide adjacent the inlet end may be of larger diameter. Here the guide is composed of a number of sections 1a, 1b and 1c of decreasing diameter. The sections are placed inside a generally conical sheath 2a which is, again, moisture proof, and provides a space filled with dry air between the rod sections and the sheath. Silvering may be provided as before at 5a, 5b, 6a and 6b, and over this there may be placed the covering of copper as at 7a, 7b, 8a and 8b. Again the whole is made tight to the sheath 2a by any suitable means 30 (glue, cement, rubber, etc.).

The flexible guide which has just been described above can be used for a large number of apparatus amongst which may be cited gastroscopes, probes for trans-illumination of the tympanum, etc.

What we claim is:

1. Illuminating device for endoscopes and the like comprising a transparent rod for transmitting the light from a source into a cavity to be illuminated: a hermetically-closed sheath surrounding the said transparent rod and forming round it a space filled with a dry gas; a reflecting deposit formed on the lateral walls of the said rod and over a short length from each of the extremities of the said rod; and a hermetically-sealed joint between the extremities of the said sheath and of the said rod.

2. In a device in accordance with claim 1, a transparent rod having as its lower extremity a polished surface normal to the axis of the said rod.

3. In a device in accordance with claim 1, a transparent rod having its lower extremity inclined at an angle to the axis of the said rod.

4. In a device in accordance with claim 1, a transparent rod having its lower extremity inclined at an angle to the axis of the said rod and covered by a reflecting deposit.

5. A device in accordance with claim 1, in combination with an endoscope having a tubular exploring means, a transparent rod which does not extend up to the extremity of the said tubular exploring means, a bevelled and polished extremity on the said transparent rod to deflect the light coming from the said source through the said rod, and optical means mounted at the extremity of the said tubular exploring means for directing the light coming from the bevelled and polished surface.

6. A device in accordance with claim 1, having at the entry of the said transparent rod, an unobstructed, unchamfered, fully exposed face, trued after assembly.

7. In a device in accordance with claim 1, a number of sections in close and exact contact and forming the said transparent rod, the surfaces of contact of two consecutive sections being perfectly trued and having no chamfer.

8. In a device in accordance with claim 1, a number of sections in close and exact contact to constitute the said transparent rod, the diameters of the said sections decreasing from the entrant extremity to the exit extremity of the said rod.

9. In a device in accordance with claim 1, a number of sections in close and exact contact to constitute the said transparent rod, the sections at the entrant extremity and the exit extremity being of rigid transparent material, and the remaining sections being of flexible transparent material.

10. Illuminating device for endoscopes and the like comprising a transparent rod for transmitting the light from a source into a cavity to be illuminated, an entrant end portion of solid transparent material, an exit end portion of solid transparent material, a section of flexible transparent material, the entrant face of said flexible section being in contact with the exit face of the said entrant end portion, and the exit face of the section being in contact with the entrant face of the said exit end portion, a reflecting deposit on the lateral part in the vicinity of the entrant extremity of the entrant end portion, a reflecting deposit on the lateral part in the vicinity of the exit extremity of the said exit end portion, a metallic tube surrounding the said entrant end portion, a metallic tube surrounding the said exit end portion, a hermetically-tight joint between each of the said end portions and the corresponding tube, a flexible hermetically-closed sheath surrounding the said section in close contact and of flexible transparent material, hermetically-tight joints between the extremities of the said sheath and the corresponding metallic tubes, and a volume of dry gas between the said section and the said sheath.

11. Illuminating device for endoscopes and the like comprising a transparent rod for transmitting the light from a source into a cavity to be illuminated, an entrant end portion of solid transparent material, an exit end portion of solid transparent material, a section of flexible transparent material, the entrant face of said flexible section being in contact with the exit face of the entrant end portion and the exit face of the section being in contact with the entrant face of the said exit end portion, a reflecting deposit on the lateral part in the vicinity of the entrant extremity of the said entrant end portion, a reflecting deposit on the lateral part in the vicinity of the exit extremity of the exit end portion, a metallic tube surrounding the said entrant end portion, a metallic tube surrounding the said exit end portion, a hermetically-tight joint between each of the said end portions and the corresponding tube, a flexible hermetically-closed sheath surrounding the said section of flexible transparent material, hermetically-tight joints between the extremities of the said sheath and the corresponding metallic tubes, a volume of dry gas between the said section and the said sheath, and a second sheath which is relatively rough and having a refractive index as low as possible between the said first-mentioned sheath and the said section.

References Cited in the file of this patent

UNITED STATES PATENTS

| | | |
|---|---|---|
| 1,550,197 | Berry | Aug. 18, 1925 |
| 1,733,239 | Roberts | Oct. 29, 1929 |
| 1,751,584 | Hansell | Mar. 25, 1930 |
| 1,965,865 | Thompson | July 10, 1934 |
| 1,968,997 | Drucker | Aug. 7, 1934 |
| 2,176,620 | Beam | Oct. 17, 1939 |
| 2,235,979 | Brown | Mar. 25, 1941 |
| 2,420,772 | Dalton | May 20, 1947 |
| 2,424,064 | Stegeman | July 15, 1947 |

FOREIGN PATENTS

| | | |
|---|---|---|
| 787,117 | France | June 24, 1935 |